Patented Aug. 11, 1953

2,648,522

UNITED STATES PATENT OFFICE 2,648,522

METHOD OF RECOVERING LOST CIRCULATION IN WELLS

Arthur L. Armentrout, Long Beach, Calif.

No Drawing. Application April 24, 1951, Serial No. 222,744

3 Claims. (Cl. 255—1.8)

This invention relates to a method of recovering lost circulation in drilling wells.

Explanatory of the present invention, circulation fluid in a well drilled by a rotary well drilling apparatus is frequently lost when the well bore traverses a cracked or highly porous formation. Under these circumstances the circulation fluid that is pumped into the well through the drill stem on reaching the cracked or porous formation, escapes through the cracks or interstices and is not returned to the surface. Many proposals have been made for plugging the cracks or interstices so as to confine the circulation fluid in the well bore and cause it to return to the surface and carry with it the cuttings that are cut by the drilling bit. In some instances the methods proposed heretofore have proven successful due to a happy coincidence that the conditions in the well were such that the plugging or sealing material used could effectively plug or seal the formation against the escape of the circulation fluid.

An object of the present invention is to provide an improved method of recovering lost circulation in wells which is more versatile in that it affords an opportunity to plug or seal the cracks or crevices in the well regardless of their peculiarities. In this manner, the method may be effectively used in virtually any well regardless of the cracked formation or the porous formation that the well bore may have traversed.

The improved method in its preferred form is conducted as follows. A sealing composition is first prepared in accordance with the disclosure of my copending application, Serial No. 213,800, filed March 3, 1951. Such a sealing material consists of approximately equal parts by weight of diatomaceous earth, expanded perlite, and coarse ground dried bentonite clay. These ingredients are thoroughly mixed together and are then mixed with water in the proportions of about 100 pounds of the dry mixture per barrel of water. This aqueous mixture forms an adequate drilling mud and in accordance with the present method serves as a carrier for carrying the aggregate down through the drill stem to be discharged therefrom into the well.

The aggregate which I employ consists of a series of screened gravels. Thus, the first aggregate employed may consist of a screened gravel having a particle size of approximately ½″ in diameter. The second aggregate employed consists of a screened gravel wherein the particle size is approximately ⅜″ in diameter. A third aggregate may consist of a screened gravel having approximately ¼″ in diameter particle size. Still a finer aggregate may be ultimately employed having a particle size of approximately ⅛″ in diameter.

As the aqueous sealing mixture is pumped into the drill stem a batch, such as for example as fifty cubic feet of the first aggregate having a ½″ particle size, is introduced into the mixture. For this purpose an apparatus such as is disclosed in my copending application Serial No. 133,387, filed December 16, 1949, now Patent No. 2,626,779, may be employed. However, the particular apparatus for introducing the aggregate into the fluid that is pumped down into the well is immaterial insofar as the present invention is concerned. The relatively large particles when they are discharged into the well from the drill stem are carried by the liquid mixture to the point or points where circulation fluid is escaping. These relatively large particles will be carried by the fluid into the cracks or crevices and may lodge themselves therein. As the aggregate has been screened so that the particle size is uniform or substantially so, the particles as they enter the cracks, crevices, or interstices are not hindered or impeded by other smaller particles. These large particles when they lodge in place form a primary framework on which later smaller particles may be deposited.

After introducing into the fluid that flows down into the well the first batch of aggregate of large particle size a second batch of somewhat smaller size, such as the ⅜″ particles, is introduced into the fluid. These particles will also be carried by the mud into the cracks and crevices and will tend to be deposited on the larger particles that have already lodged in place. Similarly, when the ¼″ particles are introduced into the fluid these may deposit on the ⅜″ particles and when the ⅛″ particles are introduced, these will be lodged or deposited on the ¼″ particles. In this manner, a framework is built up in the cracks and crevices first of relatively large particles and then there are deposited thereon particles of progressively smaller sizes. The smaller particles tend to block the escape of circulation fluid between the particles of large size. The excess particles that are not lodged in the cracks, crevices, or pores in the formation will ultimately be washed up to the surface by the circulation fluid.

The sealing mixture composed of the diatomaceous earth, expanded perlite, and bentonite clay can become highly effective on the framework of screened gravels thus produced. The expanded perlite particles follow the flow of circulation fluid quite readily and serve to seal off the space between the particles of small size. The coarse ground dried or dehydrated bentonite clay on lodging between the particles tends to expand and to lock itself in position. The bentonite clay particles, as they form part of the carrier for carrying the aggregates, will become lodged between the aggregate particles when the aggregate particles become lodged in place or are deposited one upon the other. The expansion of the bentonite clay continues for a considerable time after the clay has been initially wetted so that it continues its expansion after having been lodged or deposited on the framework. The diatomaceous earth functions somewhat to form a type of filter cake on which ingredients of the normal well drilling mud may be deposited to effectively form a sheath that will prevent the escape of the circulation mud.

In lieu of expanded perlite in the sealing composition sand might be employed. Expanded perlite, however, is preferable as it has a relatively low specific gravity and will readily be carried by the circulation fluid to the framework produced by the progressive or successive deposits of screened gravels. The proportions of diatomaceous earth, expanded perlite and bentonite clay are not critical in the sealing mixture and may be varied considerably. Other sealing compositions can be employed although the one herein described is preferred. The combination of expanded perlite, diatomaceous earth and coarse ground dried bentonite clay has proven an excellent carrier for the aggregates and the combination of expanded perlite and diatomaceous earth functions in the aqueous mixture as an excellent carrier for the larger particles of dried bentonite clay so that a pumpable mixture containing the coarse ground dried bentonite clay is obtainable.

The versatility of the present method is derived from the fact that the aggregate fed into the well is screened and it is supplied to the well in progressively smaller sizes. When the large size particles are first fed into the well these have an opportunity to be carried by the circulation fluid into the cracks and crevices without being impeded or hindered by surrounding or adjacent smaller sizes. Consequently, the large particles can be carried into the cracks and crevices and given an opportunity to lodge solidly against the walls thereof. These, in turn, form a primary framework against which progressively smaller particles may lodge and the progressively smaller particles, in turn, form a framework on which the smallest particles may lodge. Collectively, all of the particles that are progressively deposited form a framework on which the sealing medium may be deposited to form the seal that will effectively prevent the escape of circulation fluid. The coarse ground dried bentonite particles which continue to absorb water and to swell or expand after they have been lodged in place between the aggregate particles which form the framework, tend to rigidly lock the framework in place in the cracks or crevices that it is desired to plug so that a permanent closure against the escape of circulation fluid is effectively produced.

It will be readily apparent that the success of the present method is in no way dependent upon the particular circumstances of the cracks and crevices or pores in the formation. If the cracks or crevices are too small to accommodate the largest size particles these particles will not enter them but will ultimately be flushed out of the well with the circulation fluid and caught on the mud screen. The same is true of the progressively smaller sized particles. Any excess of aggregate that does not enter the cracks or crevices will be flushed out of the well and caught on the mud screen in the same manner.

While it is possible to introduce the slugs of aggregate progressively into the normal drilling mud and subsequently follow the smallest size aggregate with the aqueous mixture of sealing composition, I prefer to introduce the aggregate directly into the aqueous mixture of sealing composition so that it will be carried thereby to the location where circulation is being lost. The presence of the sealing composition enables it to become immediately effective if the lodging of the particles is such that it may deposit thereon.

The sealing composition is normally a water mixture of the diatomaceous earth, bentonite and expanded perlite. However, it is not necessarily so. In some situations, instead of using water as a vehicle for carrying the diatomaceous earth, expanded perlite, and bentonite, oil may be used to advantage. Whether the vehicle is oil or water is immaterial insofar as the present invention is concerned in that the aggregate can be carried to the cracks and crevices in the manner described and the sealing material can then be deposited thereon.

Various changes may be made in the details of the method disclosed herein without departing from the spirit and scope of the invention as defined by the appended claims.

I claim:

1. The method of recovering circulation which has been lost in the course of drilling a well which comprises introducing into the circulation fluid successive slugs of screened gravel which slugs are of progressively decreasing particle size and each of which has mixed therewith a sealing composition comprising an aqueous mixture containing substantial amounts of coarse ground, dried, bentonite clay, expanded perlite, and a finely divided silicious material whereby the larger gravel particles in the slugs first to be introduced may lodge in cracks or crevices in which the circulation is being lost and form a framework on which the smaller particles may deposit and the sealing composition may occupy the spaces between the particles and due to the continued expansion of the bentonite clay by its absorption of water after it has come to rest between the particles the entire mass may be locked in place.

2. The method of recovering circulation which has become lost in the course of drilling a well which comprises introducing into the circulation fluid successive slugs of screened gravel which slugs are of progressively decreasing particle size and each of which has mixed therewith a sealing composition comprising an aqueous mixture containing substantially equal amounts of coarse ground, dried, bentonite clay, expanded perlite, and a finely divided silicious material whereby the larger gravel particles first introduced may lodge in cracks or crevices in which the circulation fluid is being lost and form a framework on which the smaller particles may deposit and the sealing composition may occupy the spaces between the particles and the coarse ground, dried, bentonite clay contained therein may continue to expand by its continued absorption of water thus locking the entire mass in place.

3. The method of recovering circulation which has been lost in the course of drilling a well which comprises introducing into the circulation fluid successive slugs of screened gravel which slugs are of progressively decreasing particle size and each of which has mixed therewith a sealing composition comprising an aqueous mixture containing substantially equal amounts of coarse ground, dried, bentonite clay, expanded perlite and diatomaceous earth whereby the larger gravel particles that are first introduced may lodge in cracks or crevices in which the circulation fluid is being lost and form a framework on which the smaller particles may deposit and a sealing composition may occupy spaces therebetween and the coarse ground bentonite clay particles may thereafter continue to expand by further absorption of water and lock the entire mass in place.

ARTHUR L. ARMENTROUT.

References Cited in the file of this patent

UNITED STATES PATENTS

| Number | Name | Date |
|---|---|---|
| 1,807,082 | Boynton | May 26, 1931 |
| 2,337,295 | Kennedy | Dec. 21, 1943 |
| 2,561,075 | Sidwell | July 17, 1951 |